ALLAN M. RUSSELL,
INVENTOR.

ALLAN M. RUSSELL,
INVENTOR.

BY

ATTORNEY.

United States Patent Office 3,437,915
Patented Apr. 8, 1969

3,437,915
APPARATUS FOR MEASURING THE ENERGY DISTRIBUTION OF ELECTRONS EXTRACTED FROM SOLIDS
Allan M. Russell, Riverside, Calif., assignor to the United States of America as represented by the Secretary of the Navy
Filed Jan. 2, 1964, Ser. No. 335,447
Int. Cl. G01r 31/22
U.S. Cl. 324—24           3 Claims

ABSTRACT OF THE DISCLOSURE

This invention relates generally to instruments utilized for the measurement of the energy distribution of electrons extracted from solids, particularly semiconductors. The measurement of the total energy of the electrons outside the solid is an indication of the total energy that these electrons had within such solid. The invention may include a spectrometer tube which contains a collector and an emitter tip of the solid to be investigated. A DC bias, a linear sweep, and an AC modulation may be applied to the emitter tip so that detection of the output from the collector will provide the desired indication.

---

When a metal needle having a point with a radius of a few thousand angstroms is maintained at a negative potential of several thousand volts with respect to its surroundings, the potential barrier at the surface becomes so thin that electrons can tunnel from the metal into the vacuum surrounding it. Characteristic of these electrons is the fact that their total energy remains unchanged on emission from the solid. Hence, a measurement of the energy of the electrons outside of the metal serves to determine the energy which they had within the metal.

The principal object of the invention, therefore, is to provide a field emission spectrometer instrument which will accurately measure the energy distribution of electrons extracted from solid metals and semiconductors.

A further object of the invention is to provide a field emission spectrometer utilizing modulation and phase sensitive detection to investigate a range of energies and measure the direct output of the energy spectra.

Other objects, advantages and novel features of the invention will become apparent from the following detailed description of the invention when considered in conjunction with the accompanying drawings wherein.

Measurements of the energies of electrons obtained by high field emission from metals have been reported by previous investigators. It was earlier hoped that measurements of this kind would give data on the density of electronic states within the metal emitter but it has been shown that the density-of-states factor cancels out in the expression for the emitted current.

Figure 1:
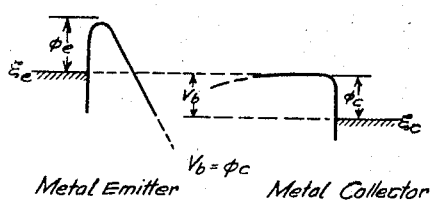
FIGURE 1 is an electron energy diagram of a metal emitter.
Figure 2:
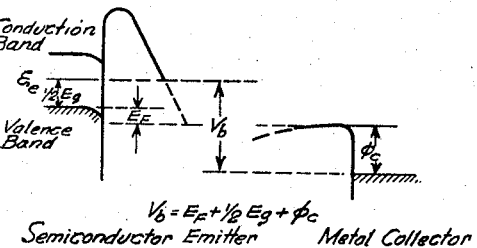
FIG. 2 is an electron energy diagram of a semiconductor emitter.

FIGS. 1 and 2 are indicative of the results obtained in the prior art. FIG. 1 is an energy diagram of a metal emitter and a metal collector showing the work functions of each and the bias required for collecting electrons emitted at the Fermi energy in the emitter. In other words, FIG. 1 is an energy diagram corresponding to the case of the emission of an electron from the Fermi level and its subsequent collection at a metal surface where the electric field is small. Note that the emitter must be biased negatively with respect to the collector by an amount equal to the work function of the collector before any current is obtained.

The situation in the case of a semiconductor emitter is considerably different. In FIG. 2, which is an energy diagram corresponding to the case of emission of electrons from the valence band of a semi-conductor at low temperature, some penetration of the electric field is shown and it is assumed that no impurity levels or surface states are present. Note that for current to be collected under these circumstances, the emitter must be biased by an amount equal to the work function of the collector plus the difference in energy between the top of the valence band and the Fermi energy at the surface of the semiconductor. Thus the energy levels of the emitted electrons can be determined by measuring the amounts by which their energies differ from the Fermi energy within the semiconductor. Markedly different results can be expected for varying conditions of the semiconductor surface. The energy spectra are much more sensitive to the surface condition than are the current-voltage measurements more commonly made in the determination of field emission.

Since the energy spectra of these electrons are directly related to the location of allowed electronic states at the surface of the solid, investigation of a range of energies and direct output of energy spectra are obtained through the use of my improved spectrometer. The latter comprises three essential components including the spectrometer tube, the power supplies and control circuits, and the detection system.

Figure 3:
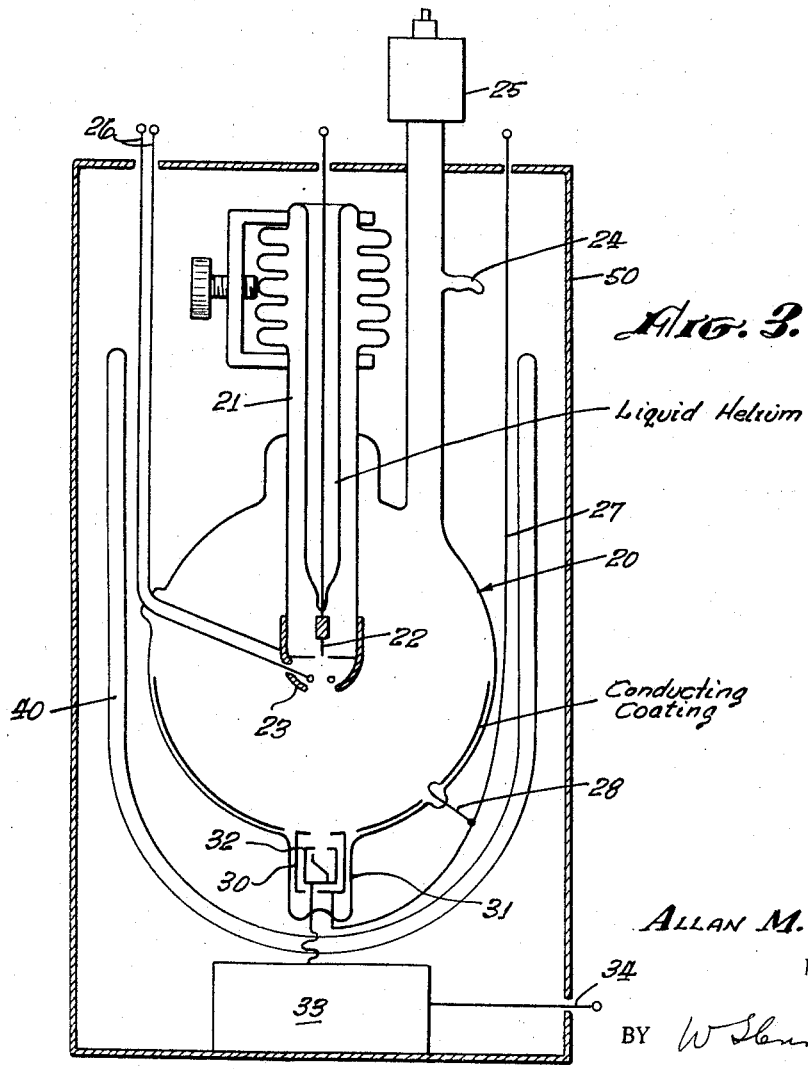
FIG. 3 is a diagrammatical view, in elevation, of the spectrometer tube.

The spectrometer tube arrangement is shown in FIG. 3. Here the tube 20 is shown inserted in a liquid nitrogen Dewar 40 and the whole enclosed in a soft iron shield 50. This arrangement allows measurements to be made at liquid helium temperatures.

The spherical geometry of the tube with the emitter tip 22 mounted effectively at the center on the hollow tube 21, permits measurements of the total kinetic energy of the electrons by the retarding potential method. The emitter to be studied is usually fabricated by electro-chemical etching. When the other interior elements of the tube and the tip have been mounted in the spectrometer tube, the tube is blown on to an ultra-high vacuum system. If tests show the tip to have a sufficiently small radius and a clean enough surface for taking the spectrometer data desired, the tube is sealed off the vacuum system at seal-off 24, retaining only an ion pump 25 and a suitable type ultra high vacuum gauge (not shown).

The central anode 23 of the tube 20 is shown mounted on hollowed cylindrical tube 21 and partially surrounds the emitter tip. This central anode is held at a high positive potential with respect to the emitter and the collector by means of the high voltage leads 26. This anode or accelerating voltage is supplied from a well-regulated DC supply. The potential of the focusing ring in the anode is obtained by topping off a resistor string placed across the supply output. This latter potential is adjusted to give maximum current at the collector for a particular anode voltage and is usually about 80% of the anode potential.

The inner lower half of the spherical tube is covered with a conductive coating which is connected to collector potential lead 27 at connection 28.

The cylindrical metal collector 30 is mounted in the lower tubular portion 31 of the spherical tube 20. This collector is connected to the collector potential lead 27. Concentric with collector 30 and mounted interiorly thereof is Faraday cage 32. This Faraday cage is provided to reduce secondary emission from the metal collector and is electrically isolated therefrom. Input capacitance at the detector is minimized by connecting the Faraday cage directly to the grid of preamplifier 33 which, in turn, is, connected by lead 34 to an electrometer amplifier (not shown).

Figure 4:
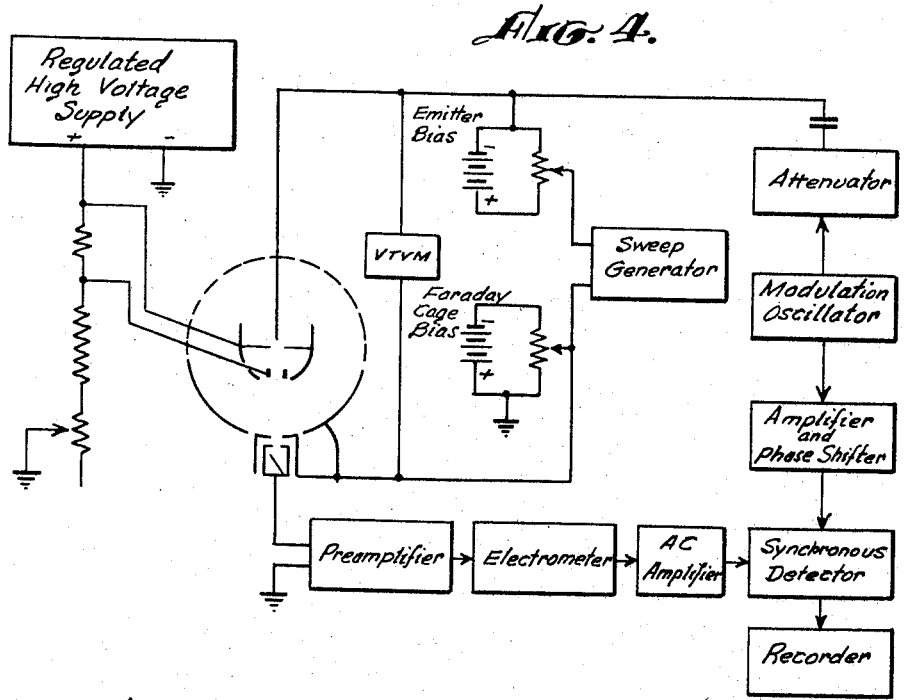
FIG. 4 is a circuit diagram of the invention with a diagrammatical view of the working parts of the spectrometer tube.

The principal elements of the spectrometer tube, its power supply and control circuits, and its detection system is illustrated in the block diagram of FIG. 4.

Three circuits control the potential of the emitter tip 22. A negative DC bias is required, as previously mentioned, to overcome the potential barrier represented by the work function of the collector, plus or minus any difference between the energy of the emitted electron and the Fermi energy in the semiconductor emitter. A linear sweep is also needed with an amplitude somewhat larger than the range of energy of the emitted electron. Dry cells provide the bias which is adjusted by means of a ten-turn potentiometer. The sweep is obtained either from a motor-driven potentiometer or from the triangular wave output of a function generator, such as the Hewlett Packard No. 202A. A vacuum-tube voltmeter and potentiometer are used to measure the sweep and bias since high impedance is required here if the waveform of the function generator is not to be distorted.

The third control potential on the emitter is the AC modulation which creates the signal subsequently measured by means of the phase-sensitive detection system.

In describing the detection system, it should be noted that earlier measurements of the energy distribution of field emitted electrons were made by varying the DC bias on the tip and measuring the collector current. This results in a curve which is the integral of the distribution. In order to obtain the number of electrons per second emitted at a particular energy, it is necessary to take the derivative of the experimental curve, a process which is not generally considered satisfactory, particularly when there is some noise in the signal or scatter in the points being recorded. Furthermore, because of the increase in the barrier width for electrons having less energy, the number of electrons being collected trails off exponentially and it is very difficult to measure small changes in the distribution at lower energies because of the large signal on which these changes are superimposed.

Figure 5:
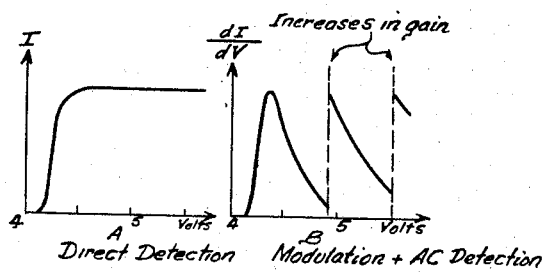
FIG. 5 is a graph showing the comparison between direct collector current output and same output after modulation and synchronous detection.

Both of these problems are avoided by the use of a phase-sensitive detector system. By applying a low amplitude AC signal to the emitter, a corresponding AC signal can be obtained at the collector which, when subsequently amplified and synchronously detected, yields energy distribution directly. This system eliminates the need for differentiating the output data and provides excellent noise rejection because of its very narrow bandwidth. In addition, it allows the distribution of electrons to be studied at energies well below the maximum energy because the DC component of the output signal is not detected. This means that the AC amplification can be increased after the first maximum in the distribution curve has been passed. As an example of the above phenomena, the curves A and B in FIG. 5 compare the ordinary DC output with the corresponding output from the synchronous detector. Here, curve A shows the DC current at the collector and curve B shows the same output after modulation and synchronous detection. Note the increases in gain indicated by the dashed vertical lines.

In the block diagram shown in FIG. 4, the modulation signal is obtained from the low frequency modulation oscillator. This source drives the low frequency amplifier and phase shifter which in turn drive the choppers in the synchronous detector. This modulation signal, substantially attenuated, is supplied to the emitter. The output can be obtained either on a ten-millivolt one-fourth second recorder, or when faster response is desired, a dual input oscilloscope, such as the Tektronix Model RM503, may be employed.

Figure 6:
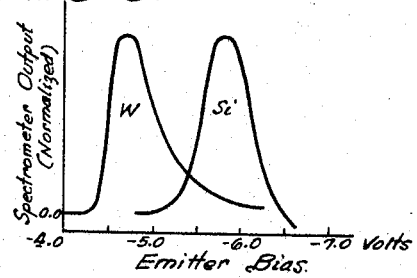
FIG. 6 is a set of sample output curves.

Using the equipment described above, certain data have been obtained from both tungsten and silicon emitters. Two sample spectra are shown superimposed for purposes of comparison in FIG. 6. The spectra obtained indicate that the electrons emitted from silicon originate from energy levels below the Fermy energy. This is the result expected for the p-type surface layer which forms when silicon is heated in a Pyrex vacuum system. The curves are normalized to the same maximum value and superimposed on the same potential scale to indicate the comparative energies of the electrons collected from each material.

Figure 7:
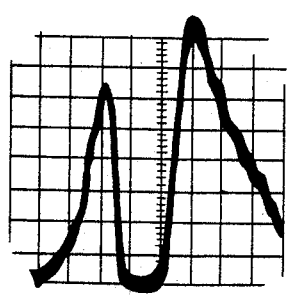
FIG. 7 is a reproduction of an oscillogram showing the field emission spectrum of a silicon sample.

FIG. 7 shows another electron energy spectrum obtained from silicon and recorded on the cathode ray oscilloscope. This spectrum indicates emission from both the conduction band and the valence band. The peaks shown are separated by approximately 1.2 v. in good agreement with the known band gap for silicon. Since this emission was obtained at room temperature, it is believed to correspond to a degenerate or nearly degenerate n-type surface. In the figure, the sweep is 0.4 v. per large division and is increasingly negative to the right.

I claim:
1. A field emission spectrometer comprising:
   a spectrometer tube containing an emitter tip of the material being investigated, and a shielded metal collector;
   means for applying a negative DC bias, a linear sweep, and an AC modulation to said emitter tip with respect to the collector;
   means for providing synchronous detection of the output received from said collector; and
   means for recording the energy distribution of the electrons emanating from said emitter tip,
   said application of said AC modulation to said emitter tip providing a corresponding AC signal at said collector capable of being synchronously detected and recorded as a direct reading of said energy distribution.

2. A field emission spectrometer as claimed in claim 1 wherein said electrometer tube comprises:
   a spherical evacuated body;
   an emitter tip mounted centrally of said body;
   a hemispherical inner conductive coating mounted in the lower half of said body;
   a central anode mounted adjacent to and surrounding said emitter tip, said anode being supplied with high voltage regulated DC;
   a metal collector mounted in the lower portion of said body, said collector being axially disposed with respect to said emitter;
   shielding means for said metal collector for reducing secondary emission from said collector;
   means for supplying liquid helium adjacent to said emitter tip;
   Dewar flask means containing liquid nitrogen surrounding said spherical body; and
   soft iron shielding means surrounding said spherical body and said Dewar flask means.

3. A field emission spectrometer comprising, in combination:
   a highly evacuated generally spherical spectrometer tube containing an emitter tip and a shielded metal collector;

means for applying a pure DC negative bias to said emitter with respect to said collector;

means for applying a linear sweep to said emitter;

means for applying a low frequency attenuated AC modulation signal to said emitter tip;

an amplifier and phase shifter driven by said means for applying a low frequency modulation to said emitter tip;

a synchronous detector for combining the signals received from said amplifier and phase shifting means and said collector; and recording means for visually indicating and recording the signal emanating from said detector.

References Cited

Review of Scientific Instruments (Russell), vol. 33, No. 12, December 1962, pages 1324–1327.

RUDOLPH V. ROLINEC, *Primary Examiner.*

E. L. STOLARUN, *Assistant Examiner.*

U.S. Cl. X.R.

250—49.5; 313—7; 324—71, 33